United States Patent [19]
Chang

[11] Patent Number: 4,780,146
[45] Date of Patent: Oct. 25, 1988

[54] MODIFIED ASPHALT

[75] Inventor: Shien-Liang Chang, Granville, Ohio

[73] Assignee: Owens-Corning Fiberglas Corporation, Toledo, Ohio

[21] Appl. No.: 890,450

[22] Filed: Jul. 30, 1986

[51] Int. Cl.$^4$ .............................................. C08L 95/00
[52] U.S. Cl. ................................. 106/273 N; 524/61; 525/54.5
[58] Field of Search ..................... 106/273 N; 208/44; 524/61; 525/54.5

[56] References Cited

U.S. PATENT DOCUMENTS

| | | | |
|---|---|---|---|
| 2,361,488 | 10/1944 | Mikeska | 106/281 R |
| 2,386,867 | 10/1945 | Johnson | 106/269 |
| 2,389,680 | 11/1945 | Mikeska | 106/281 N |
| 2,419,404 | 4/1947 | Johnson | 260/404.5 |
| 2,426,220 | 8/1947 | Johnson | 106/273 N |
| 2,482,586 | 9/1949 | Hersberge et al. | 106/273 N |
| 3,597,378 | 8/1971 | Kubiak | 106/273 N |
| 3,738,950 | 6/1973 | Sturwold et al. | 528/338 |
| 4,055,525 | 10/1977 | Cheng | 528/336 |
| 4,062,820 | 12/1977 | Mitchell, III et al. | 528/338 |
| 4,218,351 | 8/1980 | Rasmussen | 528/326 |

FOREIGN PATENT DOCUMENTS 755777  8/1956  United Kingdom ........... 106/273 N

OTHER PUBLICATIONS

Derwent Abstract Accession No. 72-08302T/05, Japanese Patent.

Primary Examiner—Amelia Burgess Yarbrough
Attorney, Agent, or Firm—Ted C. Gillespie

[57] ABSTRACT

An asphalt composition comprises a bituminous material blended with a reaction product of ethylene diamine and a blend of a dibasic acid and one or more fatty acid residues.

14 Claims, No Drawings

MODIFIED ASPHALT

TECHNICAL FIELD

This invention pertains to modified asphalts. In one of its more specific aspects, this invention pertains to asphalts modified with synthetic waxes to form compositions particularly suitable as coatings and saturants.

BACKGROUND OF THE INVENTION

The use of asphalt for roofing products such as shingles and built up roofing is well known. In order to extend the asphalt and provide reinforcement, these products, as well as other asphalt products, contain glass fiber reinforcements and mineral fillers. Other asphalt products include laminating asphalt, crack fillers, mastics and adhesives.

The preferential asphalt for such products is a coating grade asphalt or a good quality roofing flux having a softening point above about 105° C. and a penetration at 25° C. between about 17-22.

In order to reduce costs, however, harder asphalt fluxes such as paving grade asphalt must be used. This requires the use of asphalt modifiers to make the hard fluxes process easily and perform well in the asphalt products.

One known asphalt modifier which provides good results when blended with hard fluxes is an amide wax, as taught in U.S. Pat. No. 4,554,023 to Janicki. This modifier increases the softening point of the asphalt, while lowering the viscosity of the asphalt at elevated processing temperatures. Amide wax synthesis involves a condensation reaction where fatty acid and diamine are reacted together to form an amide wax and water.

A problem with the specific wax asphalt modifiers taught in the prior art, however, is their high relative cost. There is a need for lower cost asphalt modifiers which can increase the softening point of the asphalt while still giving low viscosity at processing temperatures.

STATEMENT OF THE INVENTION

This invention solves the problem of a low-cost, effective asphalt modifier, particularly for roofing products, by providing an asphalt blend which has an increased softening point over typically blown coating asphalts while having desirably low viscosity at typical elevated processing temperatures. This asphalt modifier also improves weatherability of shingles and other roofing products as compared with standard coating grade asphalt.

According to this invention, there is provided a composition comprising a reaction product of an alkyl diamine and a blend of a dibasic acid and one or more fatty acid residues. It has been found that the inclusion of a small amount of dibasic acid greatly improves the effectiveness of low cost asphalt modifier when considering such properties as softening point, penetration, flash point, viscosity, oven flow and thermal stability.

In a preferred embodiment of the invention the alkyl diamine is ethylene diamine and is present in an amount within the range of from about 5 to about 20 percent, the dibasic acid is present in an amount within the range of from about 1 to about 10 percent and the fatty acid residue is present within the range of from about 40 to about 90 percent. All percentages in the specification and claims are given as parts by weight.

In a more preferred embodiment of the invention the ethylene diamine is present in an amount within the range of from about 8 to about 12 percent, the dibasic acid is present in an amount within the range of from about 2 to about 6 percent, and the fatty acid residue is present in an amount within the range of from about 75 to about 90 percent.

In the most preferred embodiment of the invention the dibasic acid is oxalic acid. Preferably the dibasic acid has a carbon number less than 7.

According to this invention, there is also provided an asphalt composition comprising a bituminous material blended with a reaction product of an alkyl diamine and a blend of a dibasic acid and one or more fatty acid residues.

In a preferred embodiment of the invention the asphalt is present in an amount within the range of from about 90 to about 99 percent, the alkyl diamine is ethylene diamine and is present in an amount within the range of from about 0.05 to about 2 percent, the dibasic acid is present within the range of from about 0.01 to about 1 percent, and the fatty acid residue is present in an amount within the range of 0.5 to about 9 percent.

In a more preferred embodiment of the invention the asphalt is present in an amount within the range of from about 96 to about 98 percent, the ethylene diamine is present in an amount within the range of from about 0.1 to about 1 percent, the dibasic acid is present within the range of from about 0.2 percent to about 0.5 percent, and the fatty acid residue is present in an amount within the range of from abut 1.0 to about 3.5 percent.

DETAILED DESCRIPTION OF THE INVENTION

The composition of the invention can be used with any bituminous material such as tars, pitches or asphalts. The asphalt can be any natural or petroleum derived asphalt The asphalt can be any natural or petroleum derived asphalt including straight run fractionation-derived asphalt, cracked asphalts, asphalts derived from processing such as blown asphalts, propane deasphalting, steam deasphalting, chemically modified asphalts, and the like.

Ethylene diamine is the preferred alkyl diamine for use with the invention. It can be purchased from Union Carbide Corportion or Dow Chemical Company with a purity of 99 percent. Other alkyl diamines suitable for use with the invention are hexamethyl diamine and cyclohexamethyl diamine.

The fatty acid manufacturing process involves the hydrolysis of fats under high temperature and pressure, resulting in a crude fatty acid mixture. The product resulting from hydrolysis requires purification, primarily by a distillation process, to separate alcohols and vaious grades of more or less pure fatty acids. Further purification by hydrogenation converts oleic acid into stearic acid, leaving a fatty acid residue having carbon chains $C_{14}$ $C_{18}$. If solvent crystallization is used instead of hydrogenation, then the stearic acid is separated from the oleic acid. The oleic acid is then broken up (double bonds broken) into shorter chains of which 15% of this is dibasic acid. Typically, these fatty acid residues are unsaturated and have an acid value within the range of from about 80 to about 270 and an iodine value within the range of from about 2 to about 65, although the lower cost residues have acid values less than about 195. The properties of typical fatty acid residues available from Emery Industries, Inc., Cincinnati, Ohio, are given below in Table 1.

TABLE 1

| Fatty Acid Residues | | | | |
|---|---|---|---|---|
| Fatty Acid Residue | Mfg. Process | Iodine Value | Acid Value | Saponification Value |
| E988V | Tallow | 50–65 | 155–175 | 185–215 |
| E9877U | Ozone | 2–6 | 235–269 | 245–300 |
| E986 | Ozone | 2–6 | 235–269 | 245–300 |
| E981 | Stearic Acid | 10 | 80–90 | 160 |

The high acid values of E9877U and E986 are indicative of the fact that these contain some dibasic acid of the higher carbon numbers ($C_6$–$C_{14}$).

Adding more dibasic acid to the fatty acid residues raises the acid value, particularly where the residue initially has a low acid value. This improves the effectiveness of the synthetic was an an asphalt modifier. Preferably the dibasic acids have a carbon number less than 7. Adipic acid ($C_6$), available from a number of chemical companies such as DuPont, Monsanto and Allied Corporation, satisfactorily raises the softening point of asphalt.

Preferably, the dibasic acid employed is oxalic acid ($C_2$), which can be purchased from the Aceto Chemical Company, Flushing, N.Y. The short chain dibasic acid is more stable than longer chain dibasic acids.

EXAMPLE I

Various fatty acid residues were reacted with ethylene diamine and added to a 50/50 mixture of light Arabian asphalt and propane asphalt, with no additional dibasic acid, as shown in Table 2. A blend of asphalt and 4 percent bis-stearoylamine, as disclosed in U.S. Pat. No. 4,554,023 to Janicki, is also shown.

TABLE 2

| Softening of Modified Asphalt | | |
|---|---|---|
| Modifier | % Modifier | S.P. (°C.) |
| — | 0 | 54 |
| bis-stearoylamide | 4 | 110 |
| E981 | 4 | 69 |
| E9877U | 3.6 | 113 |
| E876 | 3.6 | 132 |
| E988V | 4 | 61 |

As can be seen, the lower cost fatty acid residues (E981 and E988V) do not appreciably improve the 54° C. softening point of the unmodified asphalt.

EXAMPLE II

Small amounts of adipic and oxalic acid were added to the low-cost residues (E981 and E988V) and reacted with ethylene diamine. The amount of ethylene diamine was calculated using the acid values of the fatty acid used. These modifiers were then blended with the 50/50 light Arabian/propane asphalt mixture as follows:

TABLE 3

| Effect of Dibasic Acids | | | |
|---|---|---|---|
| Modifier | S.P. (°C.) of Modifier | % Modifier in Asphalt | S.P. (°C.) of Modified Asphalt |
| E981 | 122 | 4 | 69 |
| E981/6.1% adipic | — | 4 | 89 |
| E988V | 118 | 4 | 65 |
| E988V/6.1% adipic | over 180 | 4 | over 145 |
| E988V/4.1% oxalic | 177 | 4 | 113 |

From this it can be seen that the addition of dibasic acid results in significantly improved softening points from 89° C. up to and exceeding 145° C.

EXAMPLE III

Three asphalt modifiers AM-25, AM-26 and AM-27 were prepared according to the following formulations:

TABLE 4

| Asphalt Modifier Formulations | | | |
|---|---|---|---|
| | AM-25 | AM-26 | AM-27 |
| Fatty Acid | 83% E988 | 85.1% E988 | 88.5% E9877 |
| Dibasic Acid | 6.1% Adipic | 4.1% Oxalic | None |
| Ethylene Diamine | 10.6% | 10.8% | 11.5% |

The modifiers were blended with the 50/50 light Arabian/propane asphalt blend and tested for softening point, penetration ratio, oven flow, and equiviscous temperature (EVT), which is the temperature at which the viscosity equals 125 cps. The results, given in Table 5, show that all three modifiers perform as well as the bis-stearoylamide wax.

TABLE 5

| Effect of Low-Cost Amide Waxes | | | | | |
|---|---|---|---|---|---|
| Modifier | % Modifier | S.P. (°C.) | Pen (Dmm) | EVT (°F.) | Oven Flow (in.) | Surface Appearance |
| bis-stearoyl-amide | 4 | 110 | 31 | 315 | 0 | Alligatoring |
| AM-25 | 3.6 | 107 | 29 | 336 | 0 | Smooth |
| AM-26 | 4 | 114 | 26.4 | 326 | 0 | Smooth |
| AM-27 | 3.6 | 113 | 22 | 330 | 0 | Smooth |

The oven flow test measures the amount of displacement when a 3×1×1/8 inch sample is placed for two hours in a 180° F. oven at a 75° angle.

The thermal aging effect was also tested by measuring the softening point of the four wax-modified asphalts, given in Table 6 as follows:

TABLE 6

| Thermal Aging Effect on the Softening Point of Modified Asphalts | | | | |
|---|---|---|---|---|
| Modifier | Initial S.P. (°C.) | 4 Hours | 6 Hours | 8 Hours |
| 4% bis-stearolylamide | 110 | 109 | 105 | 102 |
| 3.6% AM-25 | 107 | 98 | 90 | 82 |
| 4% AM-26 | 114 | 107 | 108 | 98 |
| 3.6% AM-27 | 113 | 112 | 99 | 94 |

The aging was conducted at a temperature of 500° F. As can be seen, AM-26 and AM-27 performed as well as the bis-stearoylamide wax, with 8 hours thermal aging softening points of 98° C. and 94° C., respectively. Thus, although initial softening point modification with adipic acid (AM-25) is quite acceptable, the thermal aging performance of oxalic acid (AM-26), as an additive to a low cost fatty acid residue (E988), is better. The softening point differential for AM-26 over 8 hours is about 16° C. Preferably, this drop-back differential will be less than about 18° C.

EXAMPLE IV

A preferred formulation using oxalic acid and a blend of two fatty acid residues, one low-cost and one high cost, was made using the following formulation:

| | |
|---|---|
| E988V | 64.0% |
| E9877U | 21.3% |
| Oxalic acid | 4.42% |
| Ethylene diamine | 10.21% |

This formulation had the following properties when mixed with Shell AC-10 and Shell Californian AR-1000 asphalts:

TABLE 7

Properties of Dual Residue Wax Modified Asphalts

| Base Stocks | S.P. (°C./ Pen (dmm) | % Modifier | S.P. (°C.) | Pen | EVT (°F.) |
|---|---|---|---|---|---|
| Shell AC-10 | 62/30 | 3.75 | 113.5 | 24.5 | 340 |
|  |  | 3.0 | 97.5 | — | — |
| Shell Californian AR-1000 | 70/10 | 3.0 | 79.5 | — | — |

From this it can be seen that the modifier using the two fatty acid residues significantly increases the softening point of the Shell AC-10, but not of the Shell AR-1000. This modifier provides good thermal stability for the asphalt. The softening point dropped only 8° C. from 113° C. (to 105° C.) when aged for 8 hours at 500° F.

It will be evident from the foregoing that various modifications can be made to this invention. Such, however, are considered within the scope of the invention.

I claim:

1. A reaction product consisting essentially of a reacted mixture of an alkyl diamine and a blend of a dibasic acid and one or more fatty acid residues, said dibasic acid having less than seven carbon atoms and said one or more fatty acid residues having an acid value within the range of from about 80 to about 270.

2. An asphalt composition comprising a bituminous material blended with a reaction product consisting essentially of a reacted mixture of an alkyl diamine and a blend of a dibasic acid and one or more fatty acid residues, wherein said dibasic acid has less than seven carbon atoms and wherein said one or more fatty acid residues has an acid value in the range of from about 80 to about 270.

3. As a composition of matter asphalt which has had its softening point appreciably increased by being combined with an additive which is:
   (i) the reaction product of a mixture consisting essentially of an alkyl diamine and a fatty acid residue having an acid value of between about 235 to about 269; or
   (ii) the reaction product of a mixture consisting essentially of an alkyl diamine, a fatty acid residue having an acid value of between about 80 to about 175, and a dibasic acid having less than seven carbon atoms; or
   (iii) the reaction product of a mixture consisting essentially of an alkylamine, a dibasic acid having less than seven carbon atoms and a blend of two fatty acid residues, one having an acid value of less than about 195 and the other an acid value of about 195 to about 270.

4. The composition of claim 3 wherein said alkyl diamine is ethylene diamine.

5. The composition of claim 4 wherein said additive is the reaction product designated as (ii) and wherein the acid value is between about 155 to about 175.

6. The composition of claim 4 wherein said dibasic acid is adipic acid or oxalic acid.

7. The composition of claim 6 wherein said additive is that designated as (ii) and wherein said acid is oxalic acid.

8. The composition of claim 4 wherein said reaction product is that designated as (iii) and wherein said asphalt is AC-10, and wherein said acid is oxalic acid.

9. The composition of claim 4 wherein said additive is that designated as (ii) or (iii) and wherein said dibasic acid is oxalic acid and wherein said composition has a drop back differential of less than about 18° C. when aged at 500° F. for eight hours.

10. The composition of claim 3 wherein the additive is the reaction product designated as (i) and wherein the amine is ethylene diamine.

11. The composition of claim 3 wherein said additive is the reaction product is that designated as (ii) wherein the amine is ethylene diamine and wherein said dibasic acid is oxalic or adipic acid.

12. The composition of claim 3 wherein said reaction product is that designated as (ii) and wherein said amine is ethylene diamine and wherein said dibasic acid is oxalic acid.

13. As a composition of matter an additive adapted to increase the softening point of asphalt, said additive being a member selected from the group consisting of:
   (i) the reaction product of a mixture consisting essentially of an alkyl diamine and a fatty acid residue having an acid value of between about 235 to about 269; or
   (ii) the reaction product of a mixture consisting essentially of an alkyl diamine, a fatty acid residue having an acid value of between about 80 to about 175 and a dibasic acid having less than seven carbon atoms; or
   (iii) the reaction product of a mixture consisting essentially of an alkylamine, a dibasic acid having less than seven carbon atoms and a blend of two fatty acid residues, one having an acid value of less than about 195 and the other an acid value of about 195 to about 270.

14. The composition of claim 13 wherein said acid is oxalic acid and wherein said amine is ethylene diamine.

* * * * *